(12) United States Patent
Battestilli et al.

(10) Patent No.: US 8,472,341 B2
(45) Date of Patent: *Jun. 25, 2013

(54) STEERING FRAGMENTED IP PACKETS USING 5-TUPLE BASED RULES

(75) Inventors: Tzvetelina B. Battestilli, Raleigh, NC (US); Steven W. Hunter, Raleigh, NC (US); Terry L. Nelms, Dallas, GA (US); Gary R. Shippy, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,500

(22) Filed: May 11, 2012

(65) Prior Publication Data

US 2012/0224581 A1    Sep. 6, 2012

Related U.S. Application Data

(63) Continuation of application No. 12/767,137, filed on Apr. 26, 2010, now Pat. No. 8,243,618.

(51) Int. Cl.
*G01R 31/08* (2006.01)
(52) U.S. Cl.
USPC ..................................................... 370/252
(58) Field of Classification Search
USPC ................. 370/230, 235, 252, 389, 392
IPC ................ H04L 49/351,41/12, 49/254, 49/205, H04L 49/354
See application file for complete search history.

(56) References Cited

U.S. PATENT DOCUMENTS

| 6,671,273 | B1 | 12/2003 | Beck |
| 7,274,706 | B1 | 9/2007 | Nguyen et al. |
| 2004/0093425 | A1 | 5/2004 | Thomas |
| 2004/0210669 | A1 | 10/2004 | Lee |
| 2004/0213152 | A1* | 10/2004 | Matuoka et al. ............... 370/230 |
| 2006/0153225 | A1* | 7/2006 | Kamiya ........................ 370/463 |
| 2009/0129394 | A1 | 5/2009 | Bar-Kovetz et al. |
| 2009/0161659 | A1* | 6/2009 | Lee et al. ...................... 370/352 |
| 2010/0020800 | A1* | 1/2010 | Abe et al. ...................... 370/392 |
| 2011/0280244 | A1* | 11/2011 | Gopinath et al. .............. 370/392 |

FOREIGN PATENT DOCUMENTS

TW    220617    8/2004

OTHER PUBLICATIONS

U.S. Appl. No. 12/767,137—Specification filed April 26, 2010.
U.S. Appl. No. 12/767,137—Non-Final Office Action Mailed February 9, 2012.

* cited by examiner

*Primary Examiner* — Jung Park
(74) *Attorney, Agent, or Firm* — Law Office of Jim Boice

(57) ABSTRACT

A method, system, and/or computer program product steers Internet Protocol (IP) packet fragments. A switch receives a first IP packet fragment that contains a 3-tuple in its header. In response to determining that the first IP packet fragment is not a lead packet fragment in the series of IP packet fragments, the first IP packet fragment is pushed onto a data stack. The switch subsequently receives a second IP packet fragment that contains a 5-tuple, which includes the 3-tuple from the first IP packet fragment plus a source port and destination port used by the second IP packet fragment. The 3-tuple is mapped to the 5-tuple in a fragmentation table, thus enabling both the first IP packet fragment and the second IP packet fragment to be steered to the destination port to which the second IP packet fragment is being sent.

16 Claims, 6 Drawing Sheets

STEERING FRAGMENTED IP PACKETS USING 5-TUPLE BASED RULES

The present application is a continuation of U.S. Pat. No. 8,243,618 B2, filed on Apr. 26, 2010 and issued on Aug. 14, 2012, and titled "Steering Fragmented IP Packets Using 5-Tuple Based Rules," which is incorporated herein by reference.

BACKGROUND

The present disclosure relates to the field of computers, and specifically to the data packet flows communicated among computers. Still more particularly, the present disclosure relates to dealing with fragmented IP packets when steering rules are based on the 5-tuple.

SUMMARY

A method, system, and/or computer program product steers Internet Protocol (IP) packet fragments. A switch receives a first IP packet fragment that contains a 3-tuple in its header. In response to determining that the first IP packet fragment is not a lead packet fragment in the series of IP packet fragments, the first IP packet fragment is pushed onto a data stack. The switch subsequently receives a second IP packet fragment that contains a 5-tuple, which includes the 3-tuple from the first IP packet fragment plus a source port and destination port used by the second IP packet fragment. The 3-tuple is mapped to the 5-tuple in a fragmentation table, thus enabling both the first IP packet fragment and the second IP packet fragment to be steered to the destination port to which the second IP packet fragment is being sent.

DETAILED DESCRIPTION

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
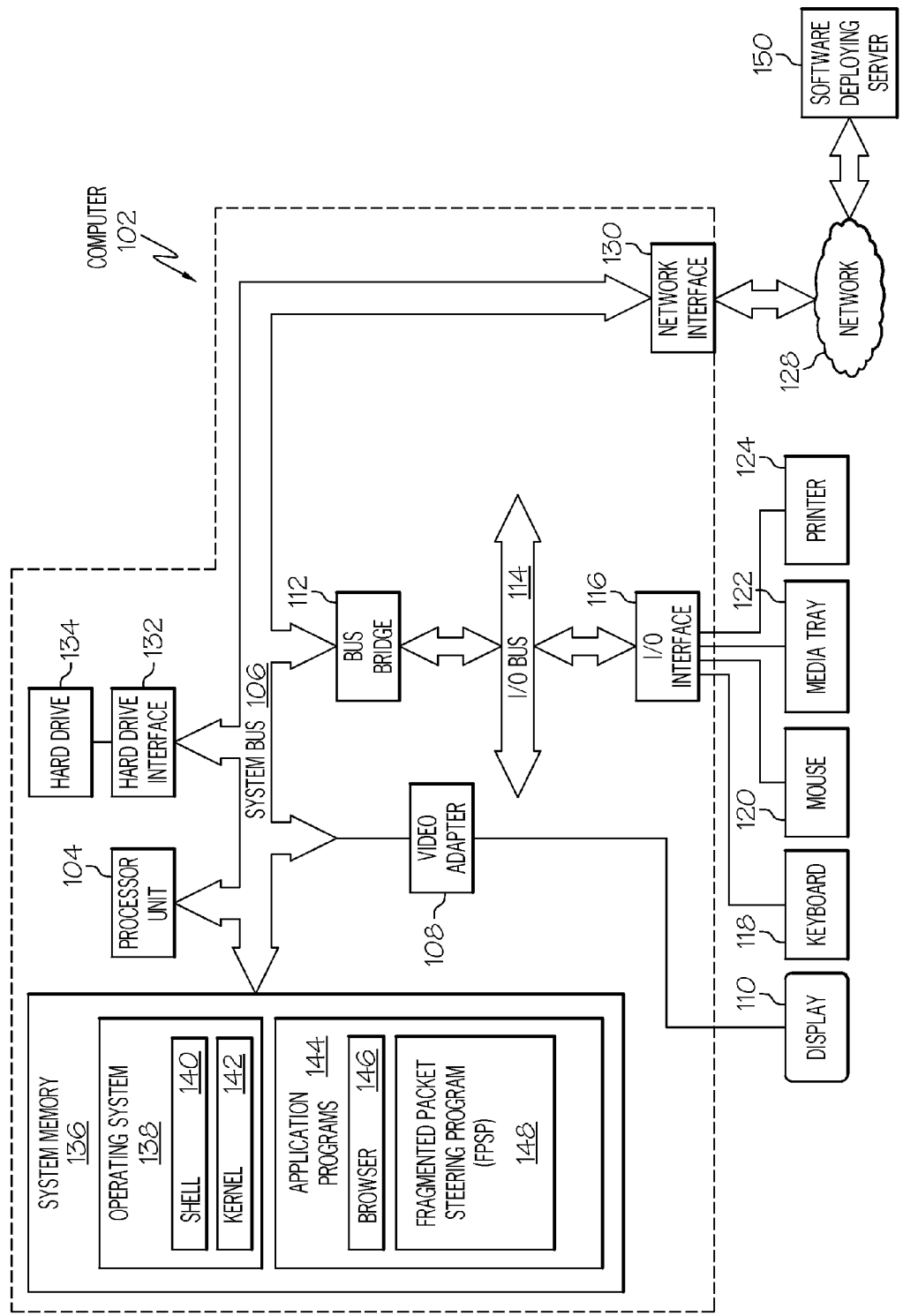
FIG. 1 depicts an exemplary computer that may be used in implementing the present disclosure.

With reference now to the figures, and in particular to FIG. 1, there is depicted a block diagram of an exemplary computer 102, which may be utilized by the present disclosure. Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and a printer 124. While the format of the ports connected to I/O interface 116 may be any known to those skilled in the art of computer architecture, in a preferred embodiment some or all of these ports are universal serial bus (USB) ports.

As depicted, in one embodiment, computer 102 is optionally able to communicate via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 also include a fragmented packet steering program (FPSP) 148, which, when executed, performs some or all of the processes described in FIGS. 2-5. In one embodiment, FPSP 148 is downloadable from software deploying server 150 in an on-demand basis, such that units of code are downloaded only when needed. In another embodiment, some or all of the processes executed by FPSP 148 are performed by software deploying server 150 itself, thus minimizing the use of resources within computer 102. Note that in one embodiment, part or all of FPSP 148 is also part of a switching logic, such as Ethernet switch 204 shown in FIG. 2, which uses all or portions of FPSP 148 with hardware/software logic (not shown in FIG. 2) to steer fragments.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

As used herein, the term "5-tuple" and/or "IP 5-tuple" is defined as five particular fields in the IP packet header. The 5-tuple in an IPv4 header includes the 1) source IP address, 2) destination IP address, 3) source port, 4) destination port, and 5) protocol for the packet and/or packet fragment. The 1) source IP address is the IP address of the sender of the packet/packet fragment. The 2) destination IP Address is the IP address of the intended recipient of the packet/packet fragment. The 3) source port is the hardware or software port that is used as a physical/logical connection to exchange data directly from one device. Examples of such ports include those dedicated to transmission control protocol (TCP) and user datagram protocol (UDP) based packets. The 4) destination port is the hardware/software port to which the packet/packet fragment is being sent. The 5) protocol is the protocol (i.e., TCP, UDP, etc.) used by the packet/packet fragment. Note that each device may have multiple ports dedicated to a particular protocol, and thus the protocol is not redundant information when read with the source and destination port information.

When IPv4 packets are routed from their source to their destination they could be fragmented by an IP router along the path. This happens when the packets pass through a link with a smaller maximum transmission unit (MTU) than the original packet size. The "original packet" is defined as the IP packet that is fragmented. "Packet fragment" (or simply "fragment") refers to a packet containing a portion of the payload of the original packet. The list of all fragments that make up the original packet is referred to as a "fragment series."

When fragmentation occurs, only the first ("lead") packet fragment retains the original IP header and thus contains the entire 5-tuple. The subsequent ("follow-on") packet fragments in the series only retain the 3-tuple in their headers, i.e. 1) source IP address, 2) destination IP address, and 3) the protocol.

There are many reasons why all the fields in the 5-tuple are used to direct traffic. For example, the source port and destination port in the IP packet header are commonly used in policy rules because of their well-known usage (e.g., domain name service—DNS, file transfer protocol—FTP, hypertext transfer protocol—HTTP). There are also cases where rules direct IP flows using the entire 5-tuple for finer control granularity. It is more advantageous for a switch to use the 5-tuple rather than just the 3-tuple in a load distribution hash in order to create a better statistical spread of the traffic across a pool of servers.

Rules based on the 3-tuple of an IP packet may not allow for desired traffic steering, since rules cannot be written to use well-known TCP ports (e.g. domain name service—DNS, secure shell—SSH, etc) to route the traffic. Furthermore, load distribution using the hash of the 3-tuple is more coarse than using the 5-tuple, and can cause more skew in the load distribution to the servers within a service.

Note that the term "fragment", "packet fragment", "IP fragment", and "IP packet fragment" are used interchangeably herein, as all terms are used to identify/describe an IP packet that is a fragment of a larger IP packet that has been fragmented during transmission, as described above. Note also that while the present disclosure describes the use of the IPv4 protocol, the features described herein are useful in any data transmission protocol that permits packet fragmentation.

Figure 2:
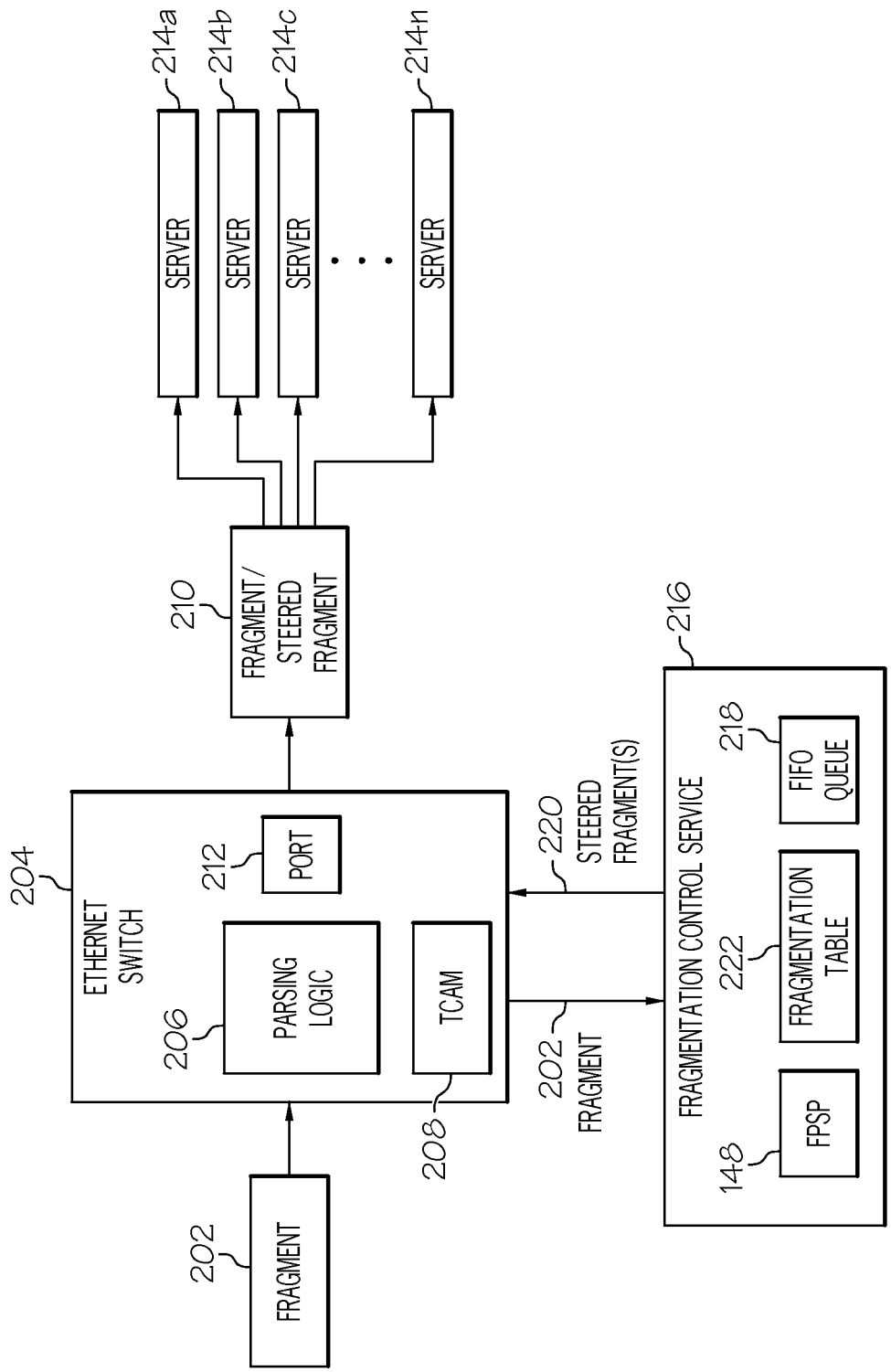
FIG. 2 illustrates Internet Protocol (IP) packet fragments being steered to their destinations.

With reference now to FIG. 2, a high level overview of a fragment 202 being steered to a destination is presented. Fragment 202 arrives at a packet switch, such as an Ethernet switch 204. Within Ethernet switch 204 is a parsing logic 206, which is able to parse the fields in an IP header (e.g. 5-tuple) of fragment 202. If fragment 202 has a full 5-tuple (and thus is the lead fragment in a fragmented original IP packet), then the parsing logic 206 is able to consult a local memory (e.g., ternary content-addressable memory—TCAM 208) to determine which local port 212 should be used to transmit the fragment 210 to a resource, such as one of the servers 214a-n (where "n" is an integer).

However, if the packet header of fragment 202 is not a lead fragment then it has only the 3-tuple fields in its header. The parsing logic 206 is able to determine that fragment 202 is not a lead fragment in a fragment series, but rather is a subsequent ("follow-on") fragment. In this embodiment, the Ethernet switch 204 sends fragment 202 to a fragmentation control service 216, which also includes a copy of FPSP 148 to control first in first out (FIFO) operations and packet steering control. In another embodiment, the parsing logic 206 controls all port steering described herein. In either embodiment, and as described in more detail below, the fragmentation control service 216 pushes subsequent fragment 202 onto a local queue, such as FIFO queue 218. In one embodiment, FIFO queue 218 is able to maintain either an original order or a reverse receiving order of fragments as they arrive. Fragment 202 stays on FIFO queue 218 until the lead fragment of a fragmented IP packet arrives at Ethernet switch 204. A fragmentation table 222 contains entries that steer all fragments in a series to a same destination port based on the 3-tuple and identification field in the header. When the lead fragment of a fragmented IP packet arrives at Ethernet switch 204, Ethernet switch 204 looks-up in TCAM 208 what to do with the series of fragments that make up the original IP packet based on the 5-tuple. The Ethernet switch 204 then forwards the lead fragment to the Fragmentation Control Service 216, where it is added to the FIFO queue 218 and the fragmentation table 222 is updated. Once the lead fragment has been received, all fragments on the FIFO queue 218 are popped off the FIFO queue 218 and steered to the appropriate port (212) that has been determined based on the 5-tuple in the lead fragment.

Figure 3:
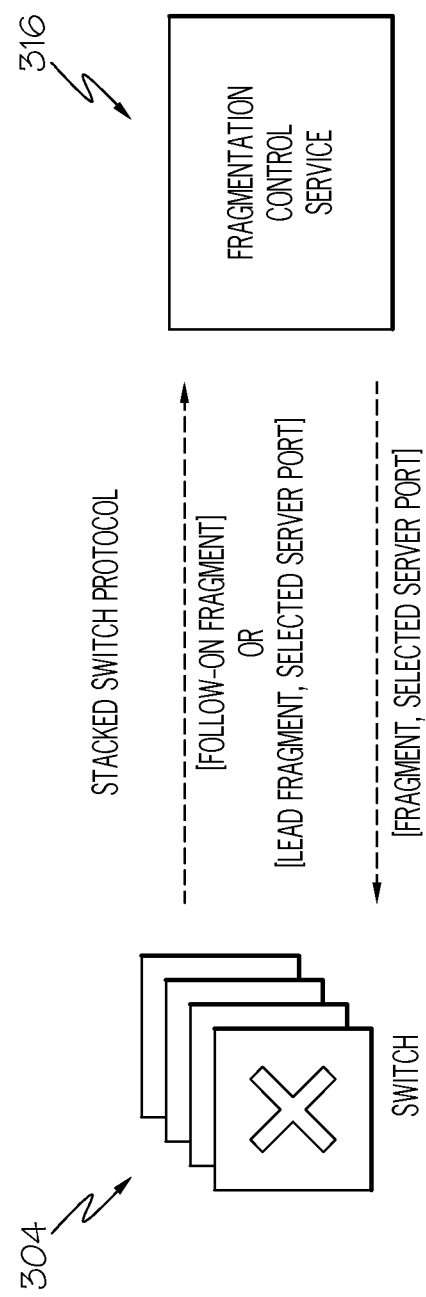
FIG. 3 depicts exemplary signaling between the Ethernet switch and the fragmentation control service depicted in FIG. 2.

Referring now to FIG. 3, exemplary signaling between a switch 304 (analogous to Ethernet switch 204 shown in FIG. 2) and a fragmentation control service 316 (analogous to fragmentation control service 216 shown in FIG. 2) is presented. Note that switch 304 may be made up of multiple switches, utilizing a stacked switch protocol. Thus, fragmentation control service 316 is linked to switch 304 using the stacked switch protocol. The link between fragmentation control service 316 and switch 304 is used for switch(es) 304 to send packet fragments (lead first fragments and subsequent follow-on fragments along with information on a selected server port) to fragmentation control service 316. The link also allows fragmentation control service 316 to send packet fragments to switch(es) 304 (switching system) by specifying the server (switch egress port) to which the packet fragments are to be directed.

Figure 4:
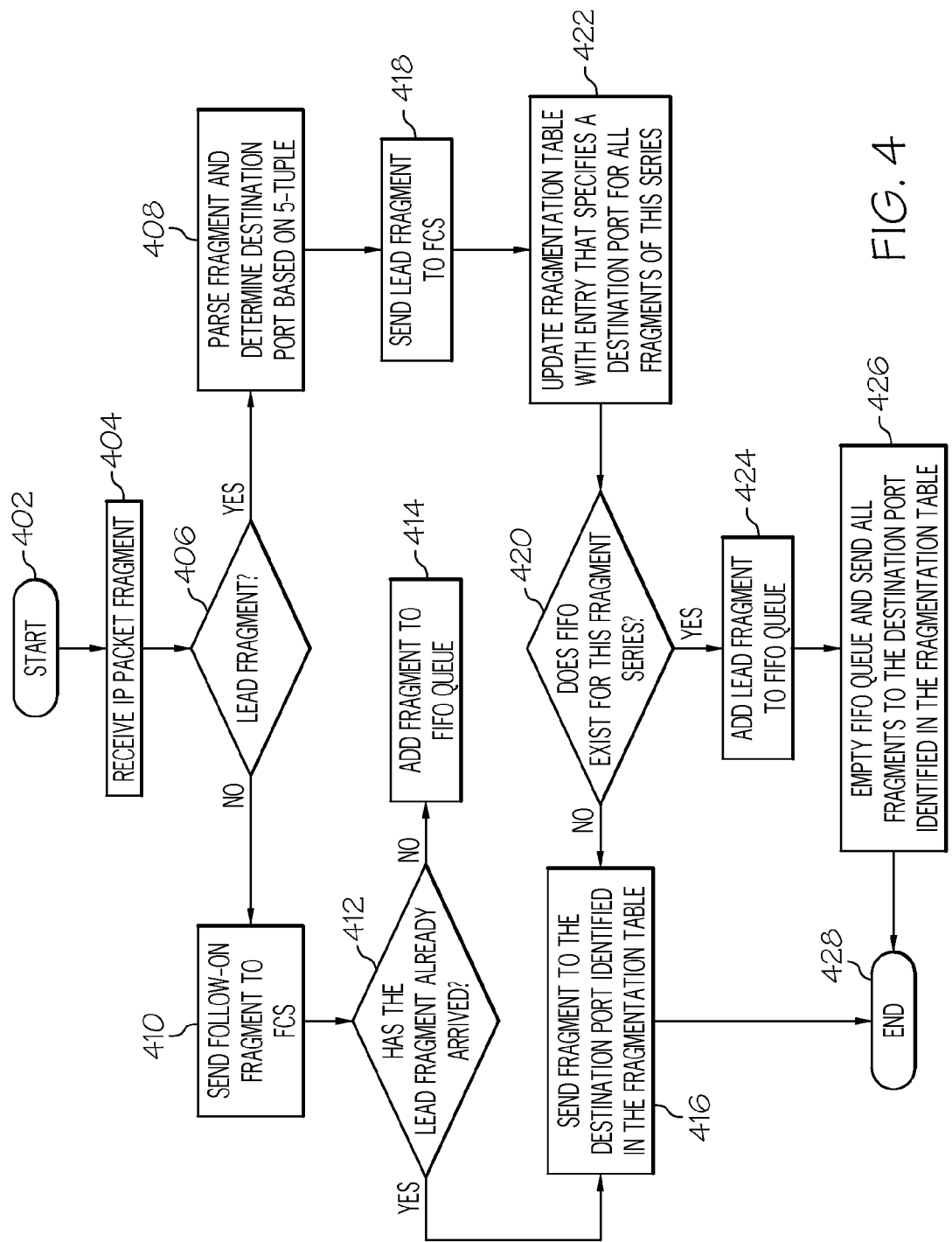
FIG. 4 is a high level flow chart of exemplary steps taken to steer IP packet fragments.

Referring now to FIG. 4, a high level flow chart of exemplary steps taken to steer IP packet fragments is presented. After initiator block 402, a switch (e.g., an Ethernet switch) receives an IP packet fragment (block 404). A query is made (query block 406) as to whether that IP packet fragment contains an IP 5-tuple, and thus is a lead fragment in a series of IP packet fragments that make up the original non-fragmented IP packet. If the fragment received at the switch is the lead fragment, then the 5-tuple is used to determine the destination port for that IP packet fragment (block 408). The lead fragment is sent to a Fragmentation Control Service (FCS) (block 418). When the lead fragment arrives at the FCS, a fragmentation table is updated with an entry of the selected destination port, which will be use to steer all fragments of this series (block 422). The fragmentation table is indexed by the 3-tuple and identification field in the IP header of each fragment. Next, it is checked whether a FIFO queue/stack exists for this fragment series (query block 420). If a FIFO queue does not exist then the lead fragment is simply sent to the destination port (block 416). If, however, a FIFO queue exists then it means that some follow-on fragments have arrived before the lead fragment. In order to preserve the receiving order, the lead fragment is added to the FIFO queue (block 424). Then the FIFO queue is emptied and all fragments are sent to the selected destination port (block 426).

However, if the IP packet fragment received at the switch is not a lead packet fragment (query block 406), then the follow-on fragment is forwarded to the FCS (block 410). In one embodiment, this communication is via a stacked switch protocol, thus allowing stacked switches to communicate with the fragmentation control service. If the lead fragment has already arrived (query block 412) then there is already an entry for this fragment series in the fragmentation table and thus the follow-on fragment is sent to the specified destination port (block 416). If however, the lead fragment has not yet arrived, then the follow-on fragment is added to a FIFO queue for this fragment series (block 414).

Note that the process described herein allows the series of packet fragments to be steered to the destination port without reassembling the original non-fragmented IP packet. Thus, the original non-fragmented IP packet remains unassembled while the series of IP packet fragments are steered to the appropriate destination port.

Figure 5A:
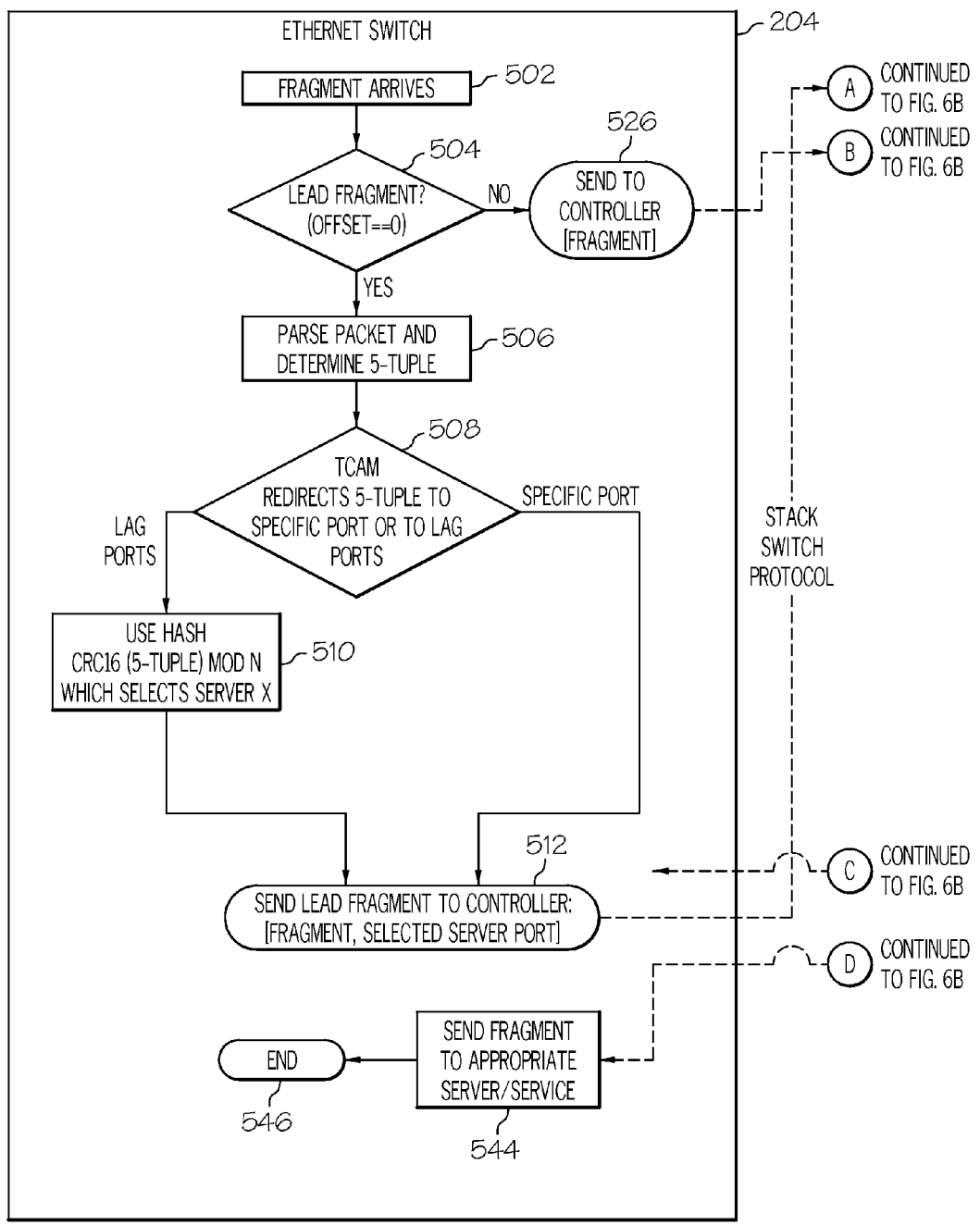
FIG. 5 is a flow chart providing further detail of exemplary steps taken by the Ethernet switch and the fragmentation control service depicted in FIG. 2 to steer IP packet fragments.
Figure 5B:
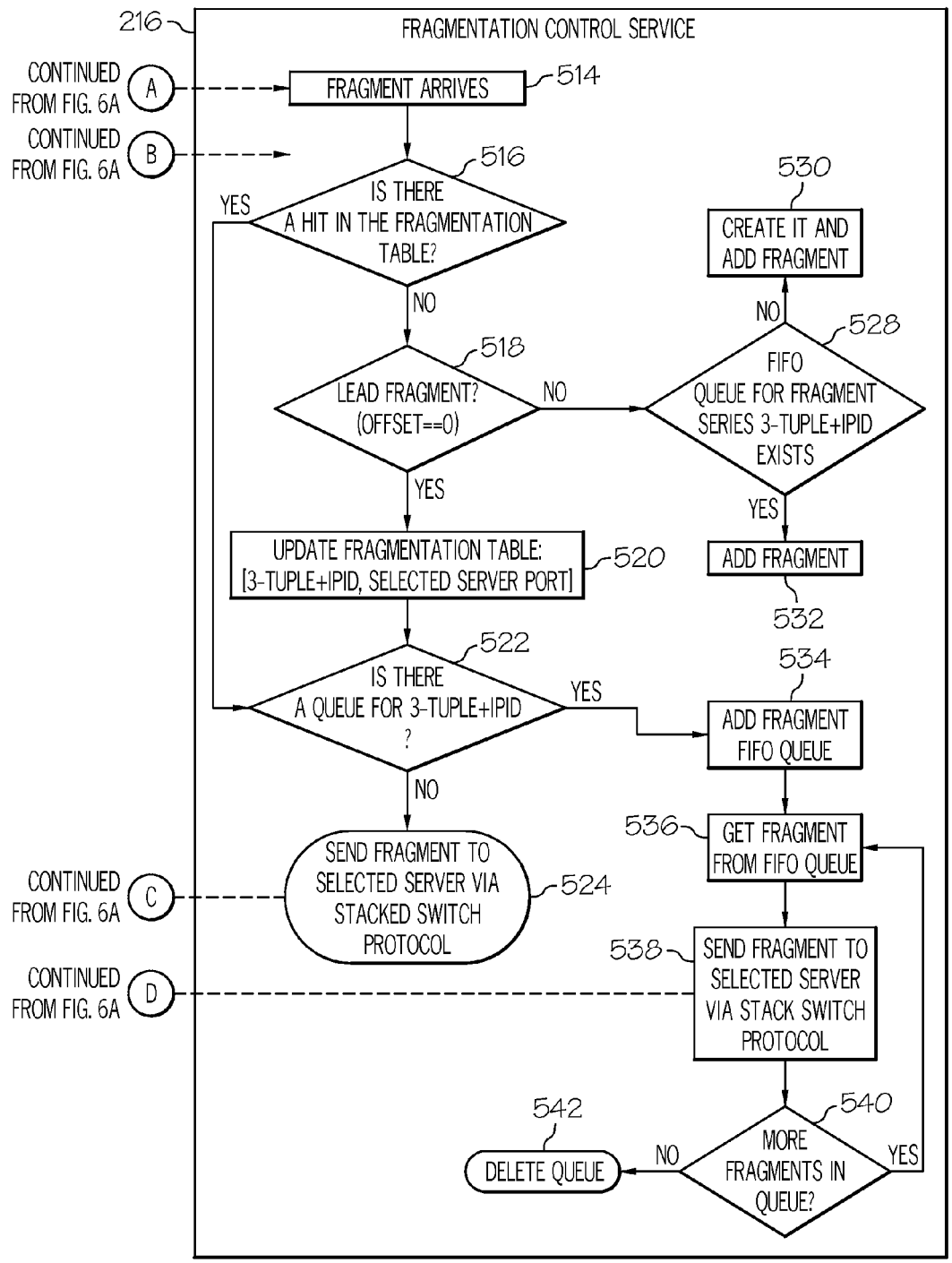

Referring now to FIG. 5, a flow chart providing further detail of exemplary steps taken by the Ethernet switch and the fragmentation control service depicted in FIG. 2 to steer IP packet fragments is presented. Before discussing the steps shown in FIG. 5, an overview of capability requirements of Ethernet switch 204 (originally depicted in FIG. 2) is now presented.

Ethernet Switch 204 Modules Preferably:

1. Support steering of packets to a service by layer 2/3 (i.e., the second data link layer (physical addressing) and third network layer (e.g., IP logical addressing) in the open systems interconnection (OSI) seven-layer model of components in a network connection) routing mechanisms. In one embodiment, rules are used to inspect the packet (packet header and deeper packet inspection) to steer the packets;

2. Include a Service composed of multiple ports/servers (defined within Ethernet switch 204 as a group such as a Link Aggregation Group (LAG));

3. Support an operation that performs sticky traffic load distribution to select a specific port within a defined service LAG to which the packet is to be sent;

4. Support a switch protocol between switch modules within a system. This switch protocol may be extended to a service/server, and provides the capability for one switch (or server) to encapsulate a packet or packet fragment, and to direct the packet to another switch port within the switching system (which may be composed of multiple individual interconnected switches). Switch protocols, such as stacked switch protocols, support both data packets and switch control packets. For the purpose of this disclosure, this protocol is referred to as a Stacked Switch Protocol.

5. Identify IP fragments and redirect them to an alternate service (switch port). However, for the lead/first fragment, the switch will first use the Layer 2/3 routing or rule steering to determine the target server before it redirects the fragment to the alternate service. Therefore, in addition to the lead fragment, the switch sends the Layer 2/3 routing or rules steering target server port to the alternate service. Thus steering information indicates the target server port (switch system egress port) to the alternate service for the packet based on the switch analysis of this lead fragment. In one embodiment, this function is a new switch hardware function.

Returning now to FIG. 5, Ethernet switch 204 (switch system) receives a packet fragment from an original IP packet (block 502). Ethernet switch 204 determines if the packet is a fragment when either a "more fragments" flag or a "fragment offset" field is non-zero in the IP header. The fragment is then examined to determine if it is a lead/first packet fragment.

If the fragment is the lead/first packet fragment (query block 504), then the packet header and 5-tuple are parsed (block 506) in order to determine what egress server port to steer all the fragments of the original IP packet. Based on TCAM look-up (block 508), the egress server port can be specified in a redirection rule based on the 5-tuple, or the redirection rule can be a rule that directs to a link aggregation group (LAG). If the fragment is to be directed to a LAG, then the switch uses a load-distribution mechanism (e.g., as Hash/crc/mod) in order to select a particular server port (block 510). In either case, the fragment and the selected server port are always sent to fragmentation control service 216 (block 512), in order to update a fragmentation table and preserve the arrival order of the fragment to Ethernet switch 204.

When the lead packet fragment arrives, Ethernet switch 204 can immediately select a destination server port (switch egress port). Information about the destination server port is sent along with the lead fragment to the fragmentation control service (block 512). Once the lead/first packet fragment arrives at fragmentation control service 216 (block 514), there is no hit in the fragmentation table (decision block 516). Therefore, the fragmentation table is updated (block 520) with an entry containing the 3-tuple plus the identification field and the selected destination server port. If there is no FIFO queue created (decision block 522), then the lead packet fragment is forwarded back to Ethernet switch 204 along with the selected server port information (block 524) over the stacked switch protocol. However, if a FIFO queue exists (decision block 522), then follow-on fragments have arrived before the lead fragment. The lead fragment is added to the FIFO queue (block 534). As described in blocks 536, 538, and 540, as soon as the lead packet fragment is added to the FIFO queue, the follow-on fragments that have been pushed onto the FIFO queue in fragmentation control service 216 are popped off and sent to Ethernet switch 204 and the FIFO queue is deleted (block 542). The fragments are sent to Ethernet switch 204 for steering to the appropriate server/service via the port identified in the lead packet fragment's 5-tuple (block 544), and the process ends (block 546).

If Ethernet switch 204 receives a fragment that is not a lead fragment (decision block 504), then it forwards it to fragmentation control service 216 (block 526). When this non-lead fragment arrives at fragmentation control service 216 (block 514), and there is no hit in the fragmentation table (block 516) because the lead fragment has not yet arrived, the fragment is added to a FIFO queue (blocks 528, 530, 532). If there is a hit in the fragmentation table (decision block 516), then it is checked whether there is a FIFO queue (block 522). If yes, then the fragment is added to the queue (block 534); else it is sent to the selected server port (block 524).

Note that in one embodiment, fragmentation control service 216 is implemented in firmware in Ethernet switch 204, assuming that: 1) the processor on which Ethernet switch 204's firmware executes has sufficient performance and throughput capability; 2) the link between Ethernet switch 204's hardware and firmware controller has sufficient bandwidth to handle the required addition of the packet fragments; and 3) the link between Ethernet switch 204's hardware and firmware provides capabilities as described above for the stacked switch link.

As described herein, the presently described method and system allows a switch to deal with fragmented IP traffic when the switch rules or the switch distribution function are based on the packet's 5-tuple without the need for packet reassembly. This process is applicable even when fragments arrive out-of-order, i.e., a lead/first fragment of a fragmented packet is not first to arrive at the switch. The switch hardware rules and/or switch-based hash/CRC/modulus load distribution function uses the lead/first fragment of a packet to select the destination server (switch port). All follow-on fragments are directed to this selected server (switch port) in the same sequence, in which the fragments were received at the switch so that the fragment receiving order is preserved. In one embodiment, logic described herein is implemented in hardware (e.g. a network accelerator) when IP fragmentation assistance is necessary for other uses besides switching.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A method of steering Internet Protocol (IP) packet fragments, wherein the IP packet fragments are components of a series of IP packet fragments, and wherein the series of IP packet fragments collectively make up a single original IP packet, the method comprising:

a switch receiving a first IP packet fragment, wherein the first IP packet fragment contains an IP 3-tuple in a header of the first IP packet fragment, and wherein the IP 3-tuple contains a source IP address of the first IP packet fragment, a destination IP address of the first IP packet fragment, and a protocol used by the first IP packet fragment;

in response to determining that a lead IP packet fragment from the series of IP packet fragments has not been received by the switch, pushing the first IP packet fragment onto a data stack;

the switch receiving a second IP packet fragment, wherein the second IP packet fragment is received subsequent to the first IP packet fragment, and wherein the second IP packet fragment is the lead IP packet fragment from the series of IP packet fragments, wherein the second IP packet fragment contains an IP 5-tuple that includes the source IP address of the first IP packet fragment, the destination IP address of the first IP packet fragment, the protocol used by the first IP packet fragment, a source port used by the second IP packet fragment, and a destination port to which the second IP packet fragment is being sent;

mapping the IP 3-tuple to the IP 5-tuple in a fragmentation table, wherein the fragmentation table indexes IP 3-tuples from subsequent IP packet fragments in the series of IP packet fragments to the IP 5-tuple from the second IP packet fragment;

popping the first IP packet fragment off the data stack; and steering the first IP packet fragment and the second IP packet fragment to the destination port to which the second IP packet fragment is being sent.

2. The method of claim 1, wherein the data stack is a first in first out (FIFO) stack.

3. The method of claim 1, wherein the data stack is maintained by a fragmentation control service that communicates with the switch via a stacked switch protocol.

4. The method of claim 1, further comprising:

pushing the second IP packet fragment onto the data stack in order to preserve a receiving order of the first IP packet fragment and the second IP packet fragment; and removing the first IP packet fragment and the second IP packet fragment from the data stack for transmission to the destination port to which the second IP packet fragment is being sent.

5. The method of claim 1, wherein the switch is an Ethernet switch.

6. The method of claim 1, wherein the single original IP packet remains unassembled while the series of IP packet fragments are steered to the same destination port.

7. A computer program product for steering Internet Protocol (IP) packet fragments, wherein the IP packet fragments are components of a series of IP packet fragments, and wherein the series of IP packet fragments collectively make up a single original IP packet, the computer program product comprising:

a non-transitory computer readable storage media;

first program instructions to receive a first IP packet fragment, wherein the first IP packet fragment contains an IP 3-tuple in a header of the first IP packet fragment, and wherein the IP 3-tuple contains a source IP address of the first IP packet fragment, a destination IP address of the first IP packet fragment, and a protocol used by the first IP packet fragment;

second program instructions to, in response to determining that the first IP packet fragment does not contain an IP 5-tuple and thus is not a lead packet fragment in the series of IP packet fragments, push the first IP packet fragment onto a data stack;

third program instructions to receive a second IP packet fragment, wherein the second IP packet fragment is received subsequent to the first IP packet fragment, and wherein the second IP packet fragment contains an IP 5-tuple that includes the source IP address of first IP packet fragment, the destination IP address of the first IP packet fragment, the protocol used by the first IP packet fragment, a source port used by the second IP packet fragment, and a destination port to which the second IP packet fragment is being sent;

fourth program instructions to map the IP 3-tuple to the IP 5-tuple in a fragmentation table, wherein the fragmentation table indexes IP 3-tuples from subsequent IP packet fragments in the series of IP packet fragments to the IP 5-tuple from the second IP packet fragment; and fifth program instructions to steer the first IP packet fragment and the second IP packet fragment to the destination port to which the second IP packet fragment is being sent; and wherein the first, second, third, fourth, and fifth program instructions are stored on the non-transitory computer readable storage media.

8. The computer program product of claim 7, wherein the data stack is a first in first out (FIFO) stack, and wherein the FIFO stack maintains a reverse receiving order of the first and second IP packet fragments.

9. The computer program product of claim 7, wherein the data stack is maintained by a fragmentation control service that communicates with the switch via a stacked switch protocol.

10. The computer program product of claim 7, further comprising:

sixth program instructions to push the second IP packet fragment onto the data stack in order to preserve a receiving order of the first IP packet fragment and the second IP packet fragment; and seventh program instructions to remove the first IP packet fragment and the second IP packet fragment from the data stack for transmission to the destination port to which the second IP packet fragment is being sent; and wherein the sixth and seventh program instructions are stored on the non-transitory computer readable storage media.

11. The computer program product of claim 7, wherein the single original IP packet remains unassembled while the series of IP packet fragments are steered to the same destination port.

12. A system comprising:

a processor, a computer readable memory, and a computer readable storage media;

first program instructions to receive a first IP packet fragment, wherein the first IP packet fragment contains an IP 3-tuple in a header of the first IP packet fragment, and wherein the IP 3-tuple contains a source IP address of the first IP packet fragment, a destination IP address of the first IP packet fragment, and a protocol used by the first IP packet fragment;

second program instructions to, in response to determining that the first IP packet fragment does not contain an IP 5-tuple and thus is not a lead packet fragment in the series of IP packet fragments, push the first IP packet fragment onto a data stack;

third program instructions to receive a second IP packet fragment, wherein the second IP packet fragment is received subsequent to the first IP packet fragment, and wherein the second IP packet fragment contains an IP 5-tuple that includes the source IP address of first IP packet fragment, the destination IP address of the first IP packet fragment, the protocol used by the first IP packet fragment, a source port used by the second IP packet fragment, and a destination port to which the second IP packet fragment is being sent;

fourth program instructions to map the IP 3-tuple to the IP 5-tuple in a fragmentation table, wherein the fragmentation table indexes IP 3-tuples from subsequent IP packet fragments in the series of IP packet fragments to the IP 5-tuple from the second IP packet fragment; and fifth program instructions to steer the first IP packet fragment and the second IP packet fragment to the destination port to which the second IP packet fragment is being sent; and wherein the first, second, third, fourth, and fifth program instructions are stored on the computer readable storage media for execution by the processor via the computer readable memory.

13. The system of claim 12, wherein the data stack is a first in first out (FIFO) stack, and wherein the FIFO stack maintains a reverse receiving order of the first and second IP packet fragments.

14. The system of claim 12, wherein the data stack is maintained by a fragmentation control service that communicates with the switch via a stacked switch protocol.

15. The system of claim 12, further comprising:
   sixth program instructions to push the second IP packet fragment onto the data stack in order to preserve a receiving order of the first IP packet fragment and the second IP packet fragment; and
   seventh program instructions to remove the first IP packet fragment and the second IP packet fragment from the data stack for transmission to the destination port to which the second IP packet fragment is being sent; and wherein
the sixth and seventh program instructions are stored on the computer readable storage media for execution by the processor via the computer readable memory.

16. The system of claim 12, wherein the single original IP packet remains unassembled while the series of IP packet fragments are steered to the same destination port.

* * * * *